2 Sheets—Sheet 1.

G. CLARK.
Method and Apparatus for Treating Cigars.

No. 217,990. Patented July 29, 1879.

Witnesses:
John Tyler
Arthur L. McIntire

Inventor
George Clark
Per Jno. C. W. McIntire Attorney

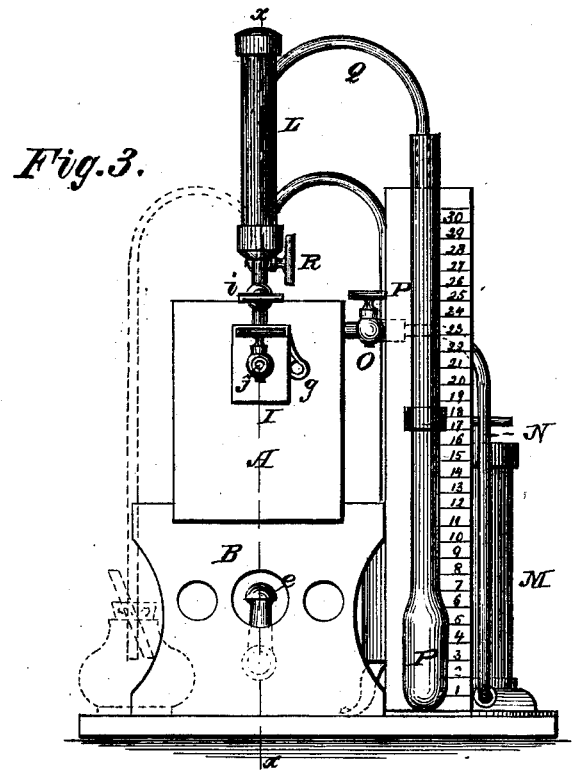

UNITED STATES PATENT OFFICE.

GEORGE CLARK, OF NEW YORK, N. Y.

IMPROVEMENT IN METHODS AND APPARATUS FOR TREATING CIGARS.

Specification forming part of Letters Patent No. 217,990, dated July 29, 1879; application filed May 22, 1879.

*To all whom it may concern:*

Be it known that I, GEORGE CLARK, of New York, in the county of New York and State of New York, have invented certain new and useful Improvements in Apparatus for Treating Cigars, &c.; and I do hereby declare that the following is a full and exact description thereof, reference being had to the accompanying drawings, making a part of this specification.

My invention relates to certain new and useful improvements in the process of purifying, drying, flavoring, and moistening tobacco, cigars, and similar substances, and in the apparatus for conducting said process.

The objects of my invention are to purify tobacco which may have become molded or otherwise impaired, and, also, to either dry and flavor tobacco and cigars, or, when such articles are, from exposure, too dry, to moisten or freshen the same; and with these ends in view my invention consists in the peculiar treatment, hereinafter explained, of tobacco, cigars, &c.; and my invention further consists in the peculiar construction and arrangement of the several parts of the apparatus for carrying out the first part of my invention, as will be hereinafter more fully set forth.

To enable others to more fully understand my invention, I will proceed to describe the same in detail, referring to the accompanying drawings, in which—

Figure 1:
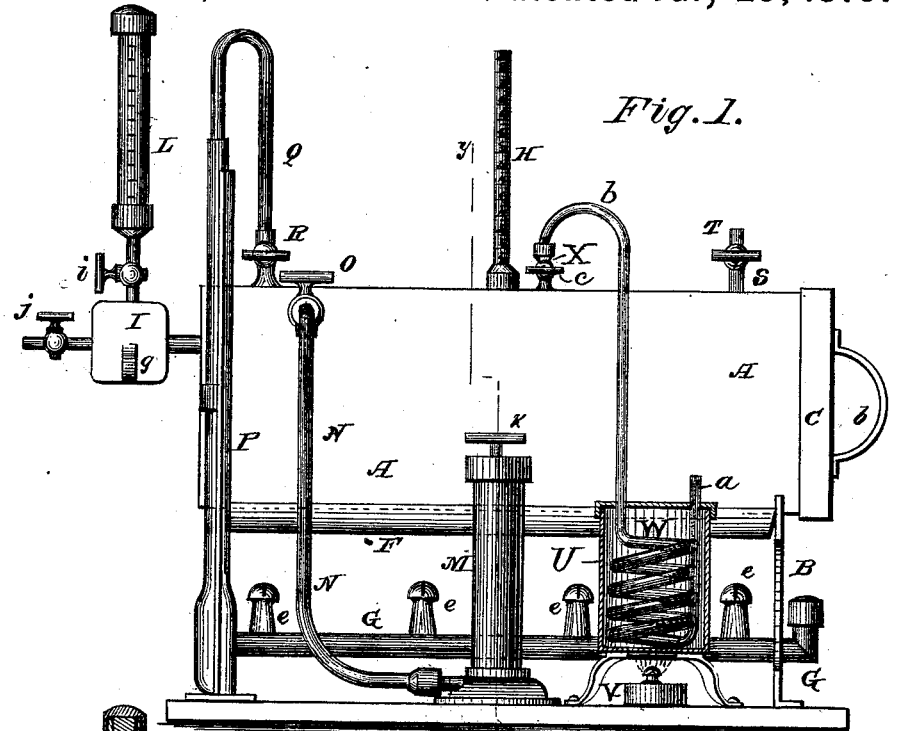
Figure 2:
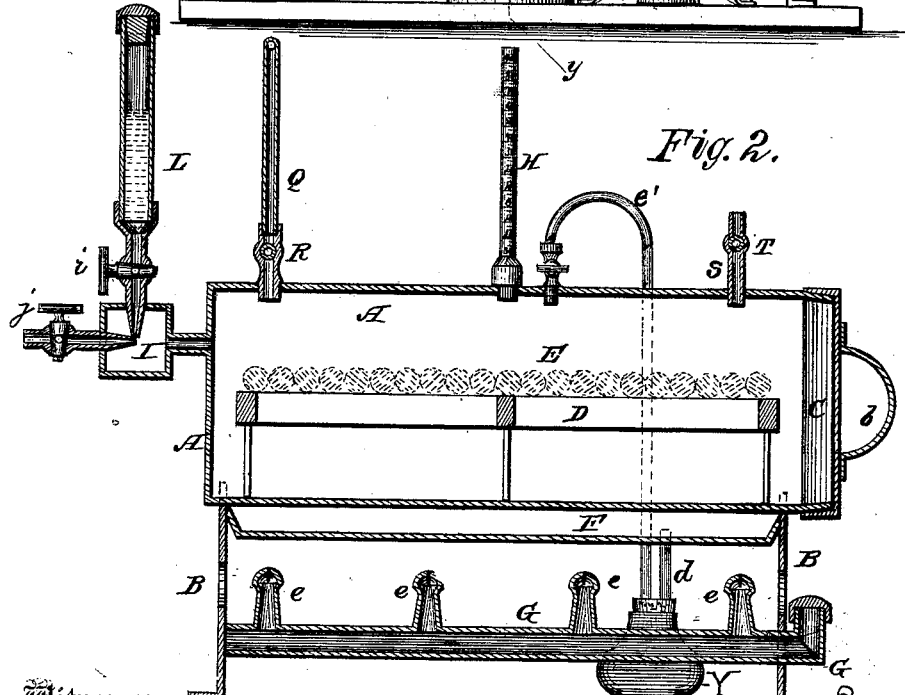

Figure 1 is a side elevation of my improved apparatus; Fig. 2, a longitudinal vertical section taken at the line $x\,x$ of Fig. 3. Fig. 3 is an end elevation, and Fig. 4 a vertical cross-section taken at the line $y\,y$ of Fig. 1.

Similar letters indicate like parts in the several figures.

A represents an air-tight chamber, of rectangular or other convenient form, mounted upon a suitable frame-work, B. This air-tight chamber is furnished with a suitable door or opening, C, at one end, through which is introduced a carriage or movable shelf, D, upon which are placed the cigars E, or other material to be treated. F is a pan arranged underneath the chamber A, designed to contain sand, which may be heated by a series of burners, G, or other heating apparatus. H is a thermometer, arranged in the top of the chamber A, by which the temperature of the interior of the same may at all times be ascertained. At one end of this chamber A is arranged an atomizer, I, the angle-tubes of which are each provided with cocks $i\,j$, the vertical pipe having connected therewith a glass tube or charger, L, for containing any suitable flavoring material. This atomizer I should be so constructed that the tubes may be readily removed for cleansing the same, and be capable of ready readjustment.

M is an exhaust-pump, connected with the chamber A by a pipe, N, in which is a stop-cock, O; and P is a barometer, connected, by a pipe, Q, and stop-cock R, with said chamber. S is an air-supply pipe, connecting through a cock, T, with the interior of the chamber A, for the purpose presently explained.

U is a cylinder, adapted to contain water, which may be heated by a lamp, V, or other heating device. Arranged within the cylinder U is a coil-pipe, W, the two ends of which project through the top of the cylinder—one (marked $a$) being short and open at the end, and the other extending upwardly, as seen at $b$, and provided with a coupling, by means of which a connection may be made with a short pipe, X, arranged in the top of chamber A, and provided with a cock, $c$.

Y is a glass bottle or other suitable receiver for a deodorant, and said receiver is provided with two pipes, $d\,e'$. The pipe $d$ is a short open pipe connecting the inside of the receiver with the atmosphere, and the other pipe, $e'$, extends upwardly and is provided with a coupling, and adapted to be connected with the pipe X when the pipe $b$ is not in position.

Having designated all of the several parts of my improved apparatus, I will now proceed to describe the processes by which the results sought are obtained.

It frequently occurs, especially with tobacco in bales, and frequently with cigars, that excessive moisture and absence of ventilation induce to the molding of the material and utterly unfit the material for use in the market. One feature of my improved process looks to the dispelling of this mold and re-establishing the natural or an improved artificial flavor of the tobacco; and I accomplish it by first placing the material within the air-tight chamber A, upon the shelf or carriage D, and close the door or opening C. The pump M is then operated to partially exhaust the air from the chamber, to produce a vacuum of a greater or less extent. The pipe c from the deodorant-vessel is then connected, as hereinbefore explained, with the chamber A, and by reason of the vacuum therein the outside atmospheric pressure causes the deodorant contained in the vessel Y to enter the chamber A to a greater or less extent, to purify the material therein contained. Where it is desirable to introduce heated air, the pipe c is disconnected from the chamber A and the pipe b connected therewith, when, for obvious reasons, the air passing through the coil becomes heated and is drawn into the chamber A.

In the treatment of ordinary tobacco, cigars, &c., to partially dry and flavor the same, they are, as before described, first placed in the receiver A, and the air being exhausted by the pump M, all moisture in the material is brought to the surface, leaving the pores or cells open, and at the same time a vacuum is produced, the character of which is indicated by the barometer P, while the temperature is at all times ascertained by the thermometer H. (The pipes S T are used, when necessary, to gradually destroy the vacuum when the operation is completed.) After the vacuum has been produced and the moisture extracted, leaving the material to be operated upon in condition to readily receive any flavoring material, the cocks i j of the atomizer are gradually opened in the order named, and the flavoring-liquid contained in the graduated tube L is atomized and injected into the chamber A by the outside atmospheric pressure. The barometer P indicates not only the character of the atmosphere inside the chamber A, but it also notes the diminution of the vacuum resulting from the injection of the flavoring-extract. Great care in the adjustment and use of the atomizer should be exercised, to avoid the liquid being injected in a stream and to insure its atomization. When the contents of the receiver A have been thoroughly impregnated, the vacuum is then entirely destroyed by opening the cock T in the pipe S.

I have found, in practice, that the quantity of flavoring material necessary for about one thousand cigars or equal amount of tobacco is from one to three drams, according to amount of flavoring desired. I have also found that a twenty-six-inch vacuum is about proper to operate the apparatus with success. When this has been accomplished by means of the pump M, and the atomizer has been used so as to reduce the vacuum to about eighteen or twenty, the use of the atomizer should cease, as the material within the chamber A will continue absorbing the flavoring-liquid so long as the vacuum exists.

When the material being treated is very green, damp, or musty, the pan F is filled with sand and heated by the burners G until the thermometer H indicates that the rarefied air within the chamber A has about reached "summer heat."

The operation just described of producing a vacuum, and of atomizing, injecting, and absorbing the flavoring extract or liquid, may be repeated if it be found that the material is not sufficiently impregnated and until a proper flavor and condition are attained.

If it should be found after one or more operations that the material has been too highly flavored, it is only necessary to return it to the chamber A and produce a greater or less vacuum, leaving the material in the chamber, with the cocks i, j, and T all closed, which is the condition of the cock also in the pipe designed to connect with the hot-air pipe and deodorant-receiver.

It will be readily observed that my improved apparatus may be used for putting tobacco in condition to be worked and handled.

Of course any suitable flavoring-liquid may be used; but, following nature, I have found that excellent results are obtained by using a strong decoction or extract made from good Havana tobacco.

What I claim as new, and desire to secure by Letters Patent, is—

1. The process herein described of treating tobacco, cigars, and other substances, consisting essentially of first subjecting the material to the action of a vacuum to extract any undue moisture contained therein, and subsequently subjecting the same, while *in vacuo*, to the action of a deodorizing or flavoring liquid in an atomized form, to purify or flavor the same, substantially as hereinbefore set forth.

2. In combination with the air-tight vessel A, provided with door or opening C, the exhaust-pump M, atomizer I, tube L, and cocks i j, thermometer H, cock and pipe S T, and barometer P, substantially as and for the purposes set forth.

3. In combination with the vessel A, provided with exhaust-pump, barometer, thermometer, and atomizer, as described, the hot-air coil-pipe W and its connections, substantially as and for the purposes set forth.

4. In combination with the vessel A, provided with exhaust-pump, atomizer, thermometer, and barometer, as described, the deodorant-vessel Y, provided with pipes d and e', and adapted to be connected in the manner and for the purposes set forth.

The foregoing specification signed by me this 5th day of May, A. D. 1879.

GEORGE CLARK.

In presence of—
W. T. HUTCHINSON,
WM. C. McINTIRE.